United States Patent [19]

Beckey

[11] Patent Number: 4,632,177

[45] Date of Patent: Dec. 30, 1986

[54] CLOCK OPERATED THERMOSTAT HAVING AUTOMATIC CHANGEOVER AND OPTIMUM START

[75] Inventor: Thomas J. Beckey, Edina, Minn.

[73] Assignee: Honeywell Inc., Minneapolis, Minn.

[21] Appl. No.: 717,919

[22] Filed: Mar. 29, 1985

[51] Int. Cl.⁴ .................... G05D 23/00; F25B 13/00
[52] U.S. Cl. ......................................... 165/12; 165/26; 236/46 R
[58] Field of Search ............... 165/12, 26; 236/46 R; 364/557

[56] References Cited

U.S. PATENT DOCUMENTS

| | | | |
|---|---|---|---|
| 2,558,610 | 6/1951 | Diekhoff | 165/12 X |
| 4,277,018 | 7/1981 | Nelson | 165/12 X |
| 4,316,256 | 2/1982 | Hendricks | 165/12 X |
| 4,373,351 | 2/1983 | Stamp, Jr. et al. | 165/12 X |
| 4,382,284 | 5/1983 | Dressel et al. | 364/900 X |
| 4,386,649 | 6/1983 | Hines et al. | 165/12 |
| 4,388,692 | 6/1983 | Jones et al. | 165/12 X |
| 4,401,262 | 8/1983 | Adams et al. | 165/12 X |
| 4,446,913 | 5/1984 | Krocker | 165/12 |
| 4,504,010 | 3/1985 | Sukimoto et al. | 236/46 F |
| 4,522,336 | 6/1985 | Culp | 236/47 X |

Primary Examiner—Albert W. Davis, Jr.
Assistant Examiner—Randolph A. Smith
Attorney, Agent, or Firm—Alfred N. Feldman

[57] ABSTRACT

A clock operated thermostat having both automatic heat-cool changeover and optimum start is disclosed. Programs for the optimum start and automatic changeover are incorporated in a microcomputer based clock thermostat and eliminate any possibility that a homeowner can inadvertently program a sequence that would cause a conflict between the heating and cooling equipment.

9 Claims, 8 Drawing Figures

CLOCK OPERATED THERMOSTAT HAVING AUTOMATIC CHANGEOVER AND OPTIMUM START

BACKGROUND OF THE INVENTION

In recent years, the conservation of energy in heating and cooling installations has become very important. The rapid rise of the cost of fuel has caused serious interest in the development of thermostatic control which is fuel efficient and which provides convenience. Convenience has been made available by the development of microcomputer or microprocessor operated thermostats. These thermostats utilize a microprocessor or microcomputer to program desired setpoint temperatures at specifically determined times. This allows for the control of temperature within a building or enclosed space in a very accurate and energy efficient manner.

The energy savings come about by the programming of an energy saving function. In a heating application the energy saving function is accomplished by lowering the setpoint during a time when the space is unoccupied or when the space can be utilized at a lower than normal temperature. The temperature can then be raised at a convenient time. Typically this can occur twice during a day in a normal residence. A first setback temperature is typically used during the nighttime hours to save energy while the occupants are asleep, and is again used during the daytime hours when the occupants of the building are away at work. This same function can be applied to cooling wherein the temperature of the building or space is raised during an unoccupied time or when the higher temperature can be comfortably adapted to. The temperature is then lowered when the building or space is normally occupied.

The heating and cooling setback and setup functions are well known, and have been developed to a high degree by the use of microcomputer or microprocessor based thermostats. These thermostats also have utilized a function known as optimum start. Optimum start is the concept of initializing the heating or cooling before a new setpoint change occurs in order to have the new setpoint change occur at about the same time the temperature actually reaches the newly designated setpoint. This type of control, however, is generally considered to be incompatible with a heating and cooling thermostat that utilizes automatic changeover.

Automatic changeover in a heating and cooling thermostat is accomplished by the thermostat automatically determining whether the heating plant or cooling plant should be in operation. This is normally accomplished by providing a fixed differential between the heating and cooling setpoint temperatures, and allowing the temperature changes to activate the correct temperature altering plant. The addition of optimum start to an automatic changeover thermostat can create problems. The optimum start may occur at a time prior to the correct setpoint for the thermostat, and can result in the heating and cooling plants operating alternately in an attempt to provide the desired control. This conflict between the heating and cooling plants must be eliminated to make a practical automatic changeover thermostat having optimum control.

SUMMARY OF THE INVENTION

The present invention is directed to a microprocessor or microcomputer based automatic changeover thermostat for heating and cooling that can be programmed for one or more setup or setback cycles. The present invention utilizes optimum start in a manner that eliminates any heating and cooling conflict. In order to accomplish this, a fixed differential between the programmed heating and cooling setpoints is provided in a microprocessor or microcomputer based program. The program ensures that the heating and cooling temperatures, during optimum start, are maintained at a determined amount so that the optimum start never can inadvertently cause the heating and cooling plants to conflict with one another. The present invention can be accomplished by shifting one of the preprogrammed setpoints when optimum start begins, or it can be provided by limiting the optimum start function so that a fixed differential between the originally programmed heating and cooling setpoints can never be violated.

In accordance with the present invention, there is provided a clock thermostat means having automatic heat-cool changeover and optimum start functions, including: microcomputer means including real time clock means and memory means; data input means connected to said microcomputer means to input a sequence of desired heat and cool control temperature setpoints and times for a desired temperature control by said thermostat means; temperature sensor means including connection means to monitor temperature at said thermostat means; said connection means connected to said microcomputer means to communicate a temperature at said sensor means to said microcomputer means; said thermostat means further including switch means adapted to control heating and cooling equipment by said thermostat means; said microcomputer means and said memory means including automatic changeover program means and optimum start program means to insure an optimum operation of said thermostat means by starting a temperature change in advance of a time for said desired temperature control; and said program means maintaining a temperature differential of at least a determined amount between said heat and cool control temperature setpoints.

DESCRIPTION OF THE PREFERRED EMBODIMENT

Figure 1:
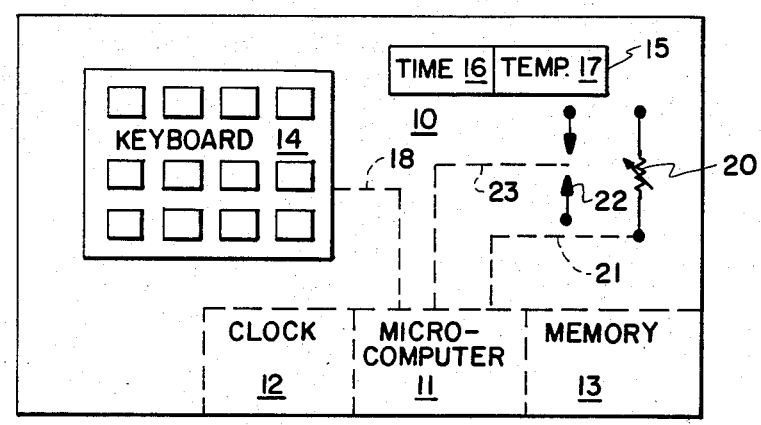
FIG. 1 is a diagram of a thermostat.

In FIG. 1 a representation of a clock thermostat means 10 is disclosed. The clock thermostat means 10 contains both an automatic heat-cool changeover function and an optimum start function. These functions are embedded in a microcomputer or microprocessor means 11. The microcomputer or microprocessor means 11 normally contains a real time clock section 12 and a memory section 13.

The thermostat means 10 has a keyboard or data input means 14. The data input keyboard means 14 is connected at 18 to the microcomputer or microprocessor means 11 to allow the inputting of various information, such as time and temperature for heating and cooling cycles. The thermostat means 10 further has a display means 15 which is capable of displaying such data as time 16, and temperature 17. The display means 15 could display other information such as day of the week, entry errors, low battery functions, etc. The time and temperature are the functions that relate to the present invention, and therefore the data display means 15 has specifically referenced these two functions.

The thermostat means 10 further includes a temperature sensing element 20 that has been shown as a variable resistor, and which has some form of connection means 21 to the microcomputer or microprocessor means 11. The thermostat means 10 further has switched contact means 22 that are controlled at 23 from the microcomputer or microprocessor means 11 and form a output for the thermostat means 10 to heating and cooling equipment.

The thermostat means 10 shown in FIG. 1 has been provided as a basis for disclosure of the present invention. Only the elements that are necessary for understanding the present invention have been shown. Many other functions and features would typically be present in a state of the art clock thermostat, but their details have been omitted for clarity sake.

Figure 2:
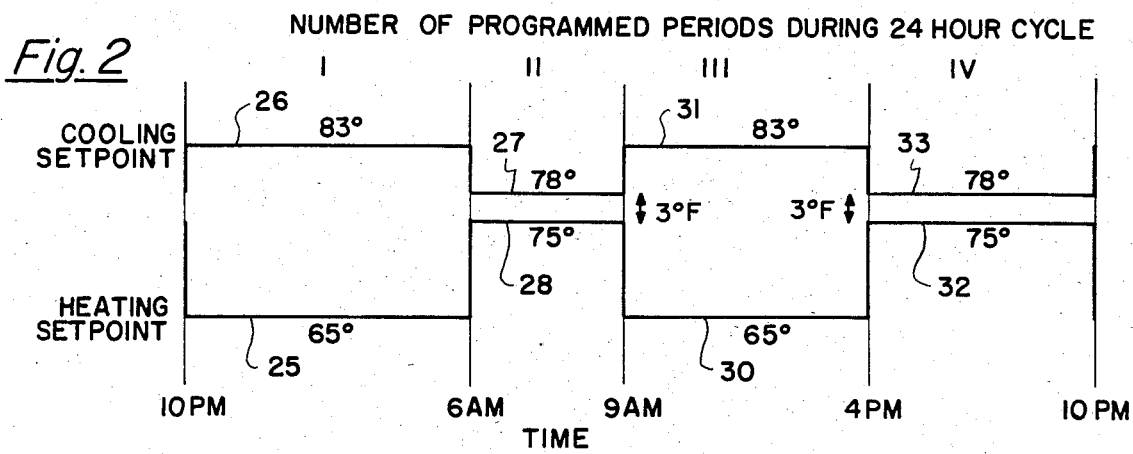
FIGS. 2 and 3 are setpoint temperatures versus time of a conventional 24 hour cycle.
Figure 3:
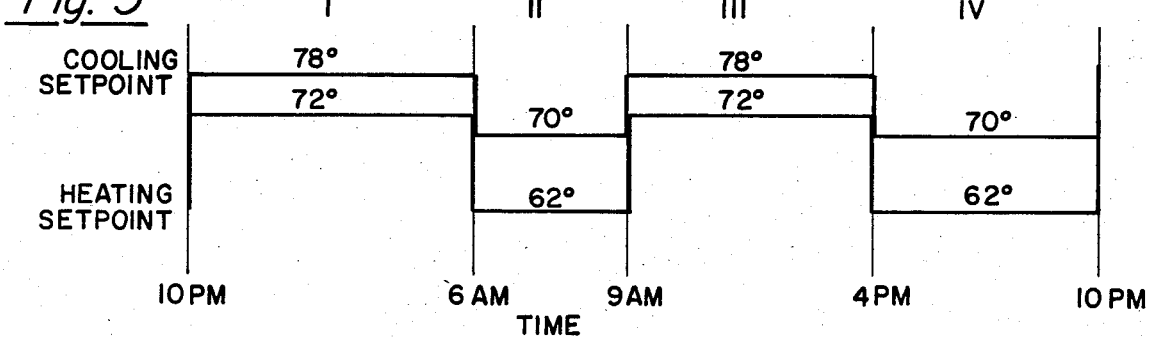

FIGS. 2 and 3 represent two different types of programmed sequences for a clock thermostat that has an automatic heat-cool changeover function without optimum start. In the sequence disclosed in FIG. 2 there is not normally a conflict between the heating and cooling setpoints that have been programmed through four representative periods of a 24 hour cycle. The variations in temperature are kept far enough apart to avoid a conflict. The periods have been identified by numerals I, II, III, and IV. In FIG. 3 the heating and cooling setpoints have been programmed in such a manner that an overlap between the heating and cooling might occur under some circumstances if optimum start was used.

In FIG. 2, an automatic changeover function would operate with optimum start, but in the case of FIG. 3, a system utilizing optimum start would create a problem, and that problem will be discussed subsequently. The four time intervals disclosed in FIG. 2 will be described in some detail, and will act as a basis for those discussed in connection with FIGS. 3 through 7.

If FIG. 2 is considered as a normal clock thermostat sequence for a full day beginning at 10 p.m. in the evening and extending to 10 p.m. the following evening, it will be noted that in a first period I between 10 p.m. and 6 a.m. a heating setpoint 25 has been programmed at 65 degrees Fahrenheit. During this same period a cooling setpoint of 83 degrees Fahrenheit has been programmed at 26. At the end of period I, which is 6 a.m. in the morning, the cooling setpoint is set down to 78 degrees Fahrenheit at 27, and the heating setpoint is set up at 28 to 75 degrees Fahrenheit. This would be the normal transition for heating and cooling where a night setback for heating and a night setup for cooling is provided so that during the time of period II, from 6 a.m. to 9 a.m., the level of comfort in the residence is normal. At 9 a.m. the residence is assumed to be unoccupied and period III begins and extends to 4 p.m. Under these conditions the heating setpoint has been set at 65 degrees Fahrenheit at 30, and a cooling setpoint of 83 degrees Fahrenheit has been set at 31. The lower heating setpoint and higher cooling setpoint during the unoccupied time of 9 a.m. to 4 p.m. is to save energy. At 4 p.m., the period IV begins and the heating setpoint is raised at 32 to 75 degrees Fahrenheit, while the cooling setpoint has been lowered to 78 degrees Fahrenheit at 33. The period of time between 4 p.m. until 10 p.m. is the time the residence would normally be occupied, and the higher temperature of 75 degrees Fahrenheit for heating and the lower temperature of 78 degrees for cooling would be normal. It will be noted in FIG. 2 that a separation of three degrees is always maintained and this typically would prevent conflict between the heating and cooling that would be caused by overshoot.

In FIG. 3 a similar four period cycle has been disclosed. In this particular case a cooling setpoint of 78 degrees Fahrenheit and a heating setpoint of 72 degrees Fahrenheit is utilized during period I. During period II, the cooling setpoint has been lowered to 70 degrees Fahrenheit while the heating setpoint has been lowered to 62 degrees Fahrenheit. It will be noted that there is an overlap in this case between the heating and cooling from period I to period II. In an automatic changeover thermostat without optimum start this creates no direct conflict in heating and cooling, but is inefficient in that an overlap of temperatures occurs. Briefly looking at periods III and IV it will be noted that the overlaps again are shown. The reason for the disclosure of the cycle of FIG. 3 will become apparent when the addition of optimum start has been provided. This is shown in FIGS. 4 and 5.

Figure 4:
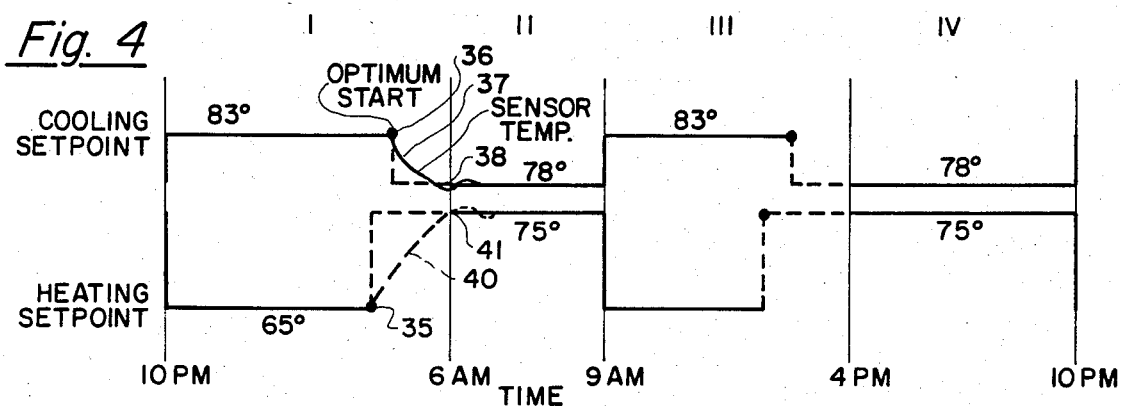
FIGS. 4 and 5 are setpoint temperatures versus time of FIGS. 2 and 3, but including optimum start.
Figure 5:
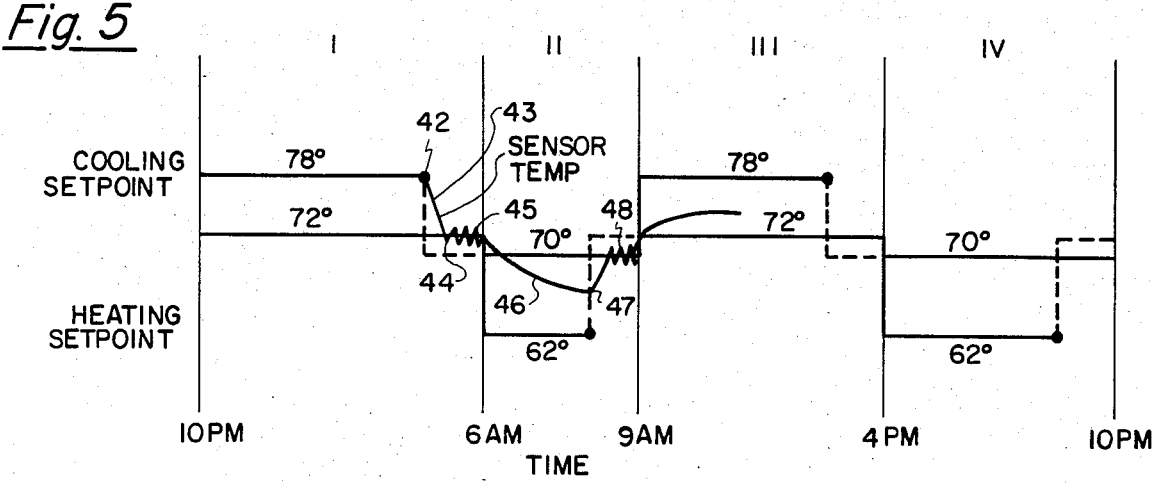

In FIGS. 4 and 5, the same cycles and temperatures as disclosed in FIGS. 2 and 3 are provided except that optimum start has been introduced without the benefit of the present invention. It will be seen in FIG. 4 that optimum start creates no problem, but that in FIG. 5 an optimum start will create a problem. These types of problems would be common in the use of this type of thermostat since many thermostat users do not fully understand the consequences of the programs that they enter into the thermostat. A brief discussion of FIGS. 4 and 5 will bring this out.

In FIG. 4, optimum start has been shown as beginning at 35 in the heating cycle and at 36 in the cooling cycle. Optimum start is a system wherein a transition from a first temperature setting occurs before a second temperature is actually programmed so that the temperature changes in the residence to meet the second preprogrammed temperature. For instance, in connection with the cooling setpoint of FIG. 4, at period I the normal cooling setpoint is 83 degrees Fahrenheit. Optimum start starts at 36 and the building or residence is caused to cool at 37 so that at 38 the actual temperature at the sensor corresponds to the 78 degree Fahrenheit cooling temperature of period II. The same thing could be done in a heating mode by allowing the temperature be intentionally driven beginning at point 35 at 60 degrees Fahrenheit in period I so that the temperature, as shown at 40, would reach 75 degrees Fahrenheit at 41 at the beginning of period II. In the case of heating, the building would be heated just before the occupants of the building or residents arise and would cause the residence or building to reach the desired 75 degrees Fahrenheit temperature at 6 a.m. in the morning. Optimum start has been used extensively in clock thermostat means and creates no particular problem in automatic changeover thermostats where a programmed difference, as disclosed in FIG. 4, has been properly provided. The difference is necessary to the extent that overshoot occurs in normal temperature cycling.

In FIG. 5 a program similar to FIG. 3 is disclosed but includes optimum start. In this particular case, optimum start creates an undesirable mode of operation. If during period I the cooling setpoint is at 78 degrees Fahrenheit and optimum start occurs at 42, the cooling plant drives the temperature down along the line indicated as the sensor temperature at 43. This causes the sensor temperature to reach 72 degrees Fahrenheit at 44. This triggers the heating plant into operation and the heating plant cycles at 45. The cycling at 45 really is a conflict between the heating and cooling plants, and is unacceptable from an energy conservation point of view. The occupants of the building will notice that the heating and cooling plants are cycling alternately and thus are fighting one another to maintain the 72 degrees Fahrenheit temperature during period I.

At 6 a.m. the sensor temperature at 45 then begins to drop at 46 towards the newly programmed temperature of 62 degrees Fahrenheit. At 47 the optimum start function occurs again in order to have the sensor temperature 48 move toward 72 degrees Fahrenheit. This is above the 70 degrees Fahrenheit cooling setpoint and unwanted cycling of heating and cooling occurs. At 9 a.m., the period III setpoints occur and the sensor temperature will then be brought under the control of the heating and cooling setpoints of 78 degrees Fahrenheit for cooling and 72 degrees Fahrenheit for heating.

As can be seen in FIG. 5, the sensor temperature at 45 cycles in an unacceptable manner where there is an overlap between the periods I and II and optimum start has been employed. This again occurs between periods II and III at 48. The invention contained in the present disclosure eliminates this problem and will be discussed in connection with FIGS. 6 and 7.

Figure 6:
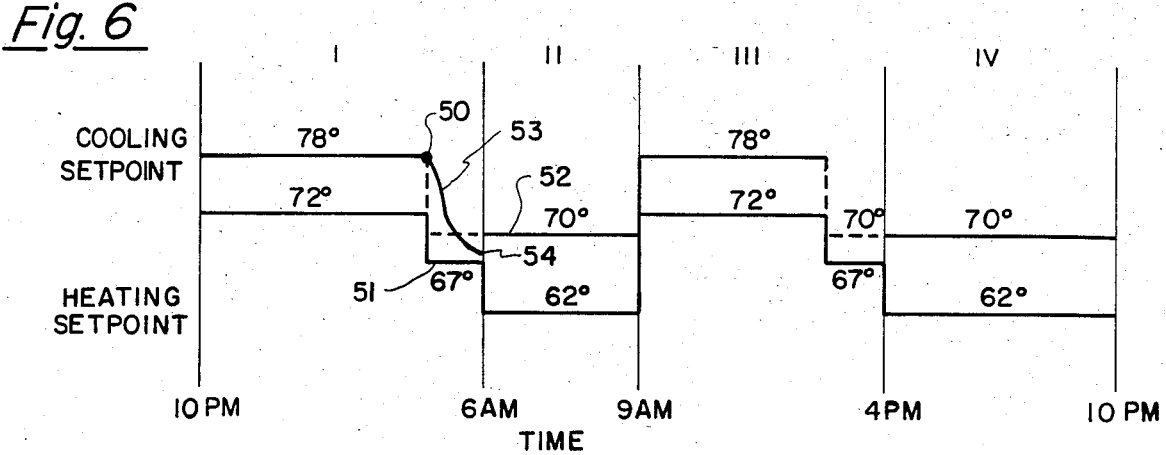
FIGS. 6 and 7 are similar to FIGS. 2 and 3 except the inventive optimum start is disclosed.

In FIG. 6 an arrangement which provides for automatic changeover and optimum start is disclosed wherein at the beginning of optimum start on cooling at 50 from the 78 degrees Fahrenheit temperature, the heating setpoint is reduced at 51 by three degrees so that it is three degrees Fahrenheit below the cooling setpoint 52 of 70 degrees Fahrenheit of the upcoming period II. In this case the optimum start temperature begins at 50 and follows a sensor temperature 53 that comes to approximately 68 degrees at 54. This could cause the occupants of the building to be uncomfortable, but is a possible solution to the present problem. It is less desirable than the solution shown in FIG. 7.

Figure 7:
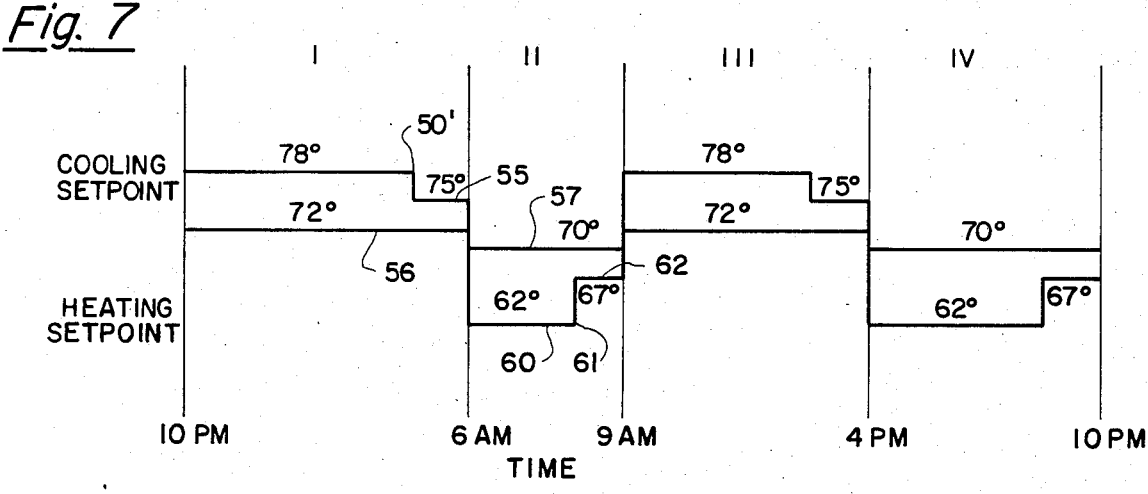

In FIG. 7 a more desirable arrangement in which a cooling offset of 75 degrees Fahrenheit is shown at 55 which is three degrees above the heating setpoint 72 degrees Fahrenheit as shown at 56. In this case, if optimum start occurs at 50'. This is an acceptable mode of operation before the period II cooling temperature setpoint 57 of 70 degrees Fahrenheit is called into operation.

In period II, a shift of the heating setpoint temperature 60 is shown at 61 so that the heating setpoint temperature of 67 degrees Fahrenheit is maintained at 62. This is a three degree difference to the cooling temperature setpoint of 70 degrees Fahrenheit. In each case, an assurance that the three degree difference is maintained between the heating and cooling setpoints with optimum start is provided.

It should be understood that the specific temperatures noted are by way of example only. A practical limit of three degrees Fahrenheit between the heating and cooling setpoints is believed approximately correct. The programmed schedule for programs of the day have been selected as fairly typical of the actual settings on clock thermostats in their normal usage.

Figure 8:
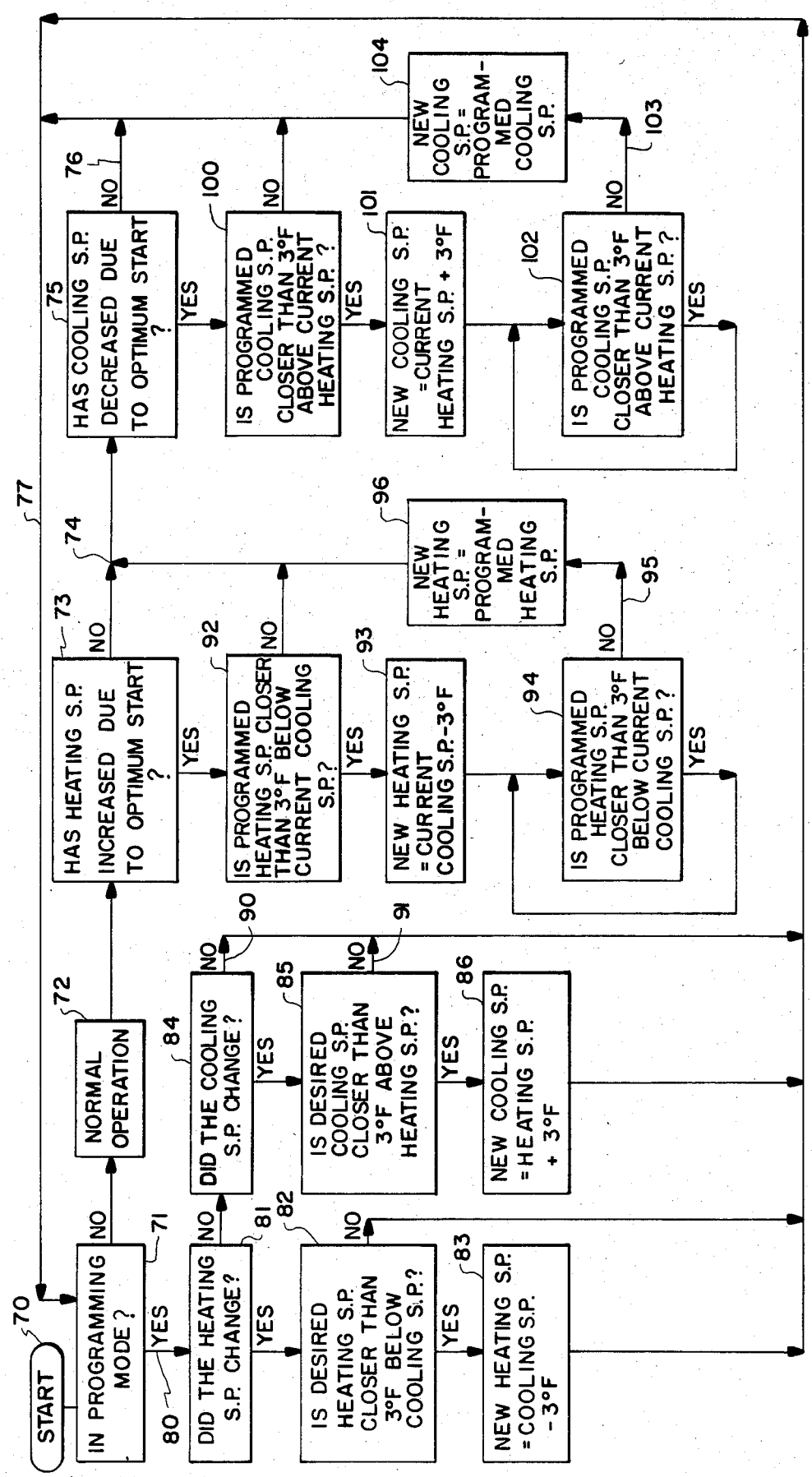
FIG. 8 is a flow chart of the operation of the thermostat.

In FIG. 8 a flow chart of the program of FIG. 7 is disclosed and will be briefly outlined. The system starts at 70 by determining at 71 whether or not the thermostat mean is in the programming mode. If it is not, the program moves to 72 which is normal operation. Normal operation then moves on at 73 to determine whether the heating setpoint increased due to the optimum start function. If it did not then at 74, the system then goes on to check at 75 to determine whether the cooling setpoint decreased due to optimum start. If it did not then at 76, the system closes back at 77 to the beginning of the program. In each of the cases at 73 and 75, if the systems had gone into an optimum start mode of operation, the optimum mode program as disclosed in FIG. 7 would be executed. This will be discussed after normal operation has been outlined.

If the programming mode at 71 had been a yes at 80, a determination would be made at 81 of whether the heating setpoint had changed. If it had at 82, the desired heating setpoint would be checked to determine if it was closer than three degrees Fahrenheit below the cooling setpoint. If it was, the system would go on at 83 to provide a new heating setpoint which equals the cooling setpoint minus the three degrees Fahrenheit. This implements the present invention.

If the heating setpoint had not changed at 81, a determination would be made 84 if the cooling setpoint had changed. If it had at 85, a determination would be made if the desired cooling setpoint was closer than three degrees Fahrenheit above the heating setpoint. If it was at 86, the new cooling setpoint would be initiated equal to the heating setpoint plus a three degree Farenheit temperature. In the event that the cooling setpoint had not changed at 90 or was proper at 91, the system would close the loop back into the line 77.

If during the normal programming mode the heating setpoint increases at 73 due to the optimum start function, the program at 92 determines whether the programmed setpoint is closer than three degrees Fahrenheit below the current cooling setpoint. If it is at 93, a new heating setpoint is provided which is equal to the current cooling setpoint minus three degrees Fahrenheit. That information is provided to the block of the program at 94. In this block the determination is made whether the programmed heating setpoint is closer than three degrees Fahrenheit below the current cooling setpoint. If it is, the system sits and waits until this situation corrects itself. Upon being corrected, an exit at 95 is provided with a new heating setpoint equal to the programmed heating setpoint at 96. That completes a heating mode with optimum start.

If optimum start is available for the cooling mode at 75, the system checks at 100 to determine whether the programmed cooling setpoint is closer than three degrees Fahrenheit above the current heating setpoint. If it is at 101, a new cooling setpoint is made equal to the current heating setpoint plus three degrees Fahrenheit. The system then moves on to 102 where the programmed cooling setpoint is checked to determine if it is closer than three degrees Fahrenheit above the current heating setpoint. If it is, the system sits in a closed loop until the condition corrects itself at 103. At 103, the output is checked at 104 to make sure a new cooling setpoint is equal to the programmed cooling setpoint provided, and the system then goes into normal operation by completing the loop back to conductor 77.

The flow chart of FIG. 8 provides the detailed implementation of the type of program disclosed in FIG. 7. A flow chart for a comparable arrangement for FIG. 6 is quite obvious and has not been provided in detail.

The present invention can be implemented by the use of different temperatures, setpoints, equipment, and programs. At least two novel arrangements have been disclosed in the present disclosure, and the applicant wishes to be limited in the scope of his invention solely by the scope of the appended claims.

The embodiment of the invention in which an exclusive property or right is claimed are defined as follows:

1. Clock thermostat means having automatic heat-cool changeover and optimum start functions, including: microcomputer means including real time clock means and memory means; data input means connected to said microcomputer means to input a sequence of desired heat and cool control temperature setpoints and times for a desired temperature control by said thermostat means; temperature sensor means including connection means to monitor temperature at said thermostat means; said connection means connected to said microcomputer means to communicate a temperature at said sensor means to said microcomputer means; said thermostat means further including switch means adapted to control heating and cooling equipment by said thermostat means; said microcomputer means and said memory means including automatic changeover program means and optimum start program means to insure an optimum operation of said thermostat means by starting a temperature change in advance of a time for said desired temperature control; and said program means maintaining a temperature differential of at least a determined amount between said heat and cool control temperature setpoints as the thermostat means switches through the sequence of desired heat and cool control temperature set points and to allow said program means to function without conflicting operation of said heating and cooling equipment.

2. Clock thermostat means as claimed in claim 1 wherein said program means maintains said determined temperature differential between said heat and said cool control temperature setpoints by overriding the desired heat or cool control temperature setpoint.

3. Clock thermostat means as claimed in claim 2 wherein said thermostat means includes display means to display data from said data input means and said microcomputer means.

4. Clock thermostat means as claimed in claim 3 wherein said data input means is a keyboard.

5. Clock thermostat means as claimed in claim 4 wherein said display means includes a digital display of time and temperature.

6. Clock thermostat means as claimed in claim 2 wherein said differential is maintained by overriding the desired heat or cool control temperature setpoint from which said optimum operation is begun.

7. Clock thermostat means as claimed in claim 6 wherein said thermostat means includes display means to display data from said data input means and said microprocessor means.

8. Clock thermostat means as claimed in claim 7 wherein said data input means is a keyboard.

9. Clock thermostat means as claimed in claim 8 wherein said display means includes a digital display of time and temperature.

* * * * *